United States Patent [19]

Imataki et al.

[11] 4,174,883
[45] Nov. 20, 1979

[54] REAR PROJECTION SCREEN

[75] Inventors: Hiroyuki Imataki, Tokyo; Hitoshi Toma, Kawasaki; Noboru Narita, Yokohama, all of Japan

[73] Assignee: Canon Kabushiki Kaisha, Tokyo, Japan

[21] Appl. No.: 860,458

[22] Filed: Dec. 14, 1977

Related U.S. Application Data

[63] Continuation of Ser. No. 543,432, Jan. 23, 1975, abandoned.

[30] Foreign Application Priority Data

Jan. 29, 1974 [JP] Japan ................................. 49-12410

[51] Int. Cl.² ............................................ G03B 21/60
[52] U.S. Cl. ...................................... 350/126; 428/38
[58] Field of Search .................. 350/117, 126; 428/38, 428/240; 264/5, 15

[56] References Cited

U.S. PATENT DOCUMENTS 3,591,253  7/1971  DePalma ............................. 350/126

FOREIGN PATENT DOCUMENTS 1946680  5/1970  Fed. Rep. of Germany ........... 350/126

Primary Examiner—Richard A. Wintercorn
Attorney, Agent, or Firm—Fitzpatrick, Cella, Harper & Scinto

[57] ABSTRACT

A rear projection screen comprises a light scattering member composed of a melted mixture containing at least two high polymers having different refractive indexes.

28 Claims, 2 Drawing Figures

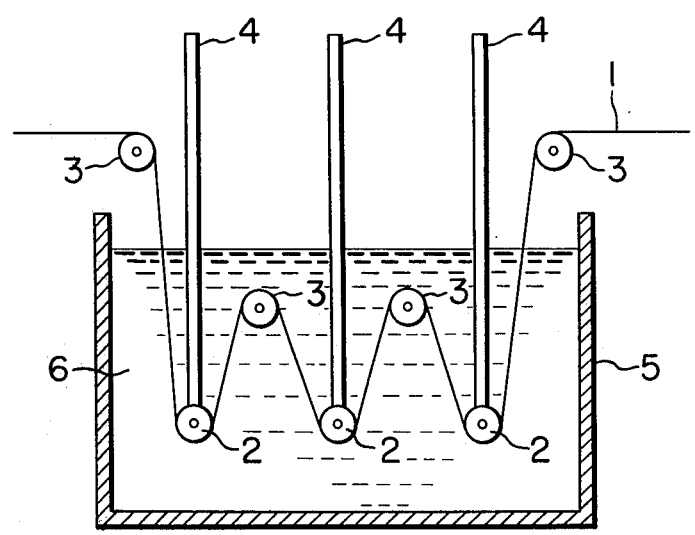

REAR PROJECTION SCREEN

This is a continuation of application Ser. No. 543,432 filed Jan. 23, 1975, and now abandoned.

BACKGROUND OF THE INVENTION

1. Field of the Invention

This invention relates to a rear projection screen and a process for producing the same. More particularly, this invention relates to a rear projection screen comprising a light scattering member composed of a melted mixture containing at least two high polymers having different refractive indexes, and a process for producing the same.

2. Description of the Prior Art

In general, projection screens are classified into a front projection screen (reflection type) and a rear projection screen (transmission type). The rear projection screen is very useful because it enables one to compactly constitute a projection apparatus for simply projecting a film for slide, microfiche, 8 m/m and 16 m/m cinefilms. In addition, the rear projection screen is also useful as a large scale screen for video projectors which draw attention in this information oriented age.

Heretofore, most rear projection screens have been so-called coating type screens which are produced by coating a transparent or semi-transparent support with a pigment, glass powders, synthetic resin spheres, aluminum metal powders and the like dispersed in a vehicle. Other types of rear projection screens having some other advantages, i.e. rear projection screens utilizing light scattering effect caused by crystalline particles formed in a crystalline high polymer material, are also known, for example, as shown in Japanese Utility Model Publication No. 14236/1968 and Japanese Patent Publication No. 19257/1973.

When a commercially available crystalline high polymer material is directly made into a rear projection screen, the resulting rear projection screen can not satisfy the advantageous characteristics for a rear projection screen such as excellent light transmission (bright), excellent light scattering transmission, no glare, and high resolution power. Therefore, the commercially available crystalline high polymer material is once melted, shaped into a film, sheet or plate and subjected to a crystal growing heat treatment to impart the desired characteristics. In other words, high polymer materials are generally considered as amorphous, but it is known that high polymer materials rich in regular and symmetric repeating units show crystalline properties. However, the light scattering property usually available is so poor that it is not sufficient for a rear projection screen. Therefore, it is necessary to subject it to a crystal growing heat treatment for the purpose of enhancing the crystallinity or controlling the arrangement state of crystals to obtain excellent optical characteristics, particularly, high light scattering property.

The crystalline state of crystalline high polymers largely depends on the crystallization condition upon crystallizing from the melted state, i.e. heat hysteresis, as well as easiness of crystallization of the molecule itself constituting the polymer, to a great extent. For example, when the crystalline high polymer is gradually cooled from the melted state, the crystal size is very large, but when the crystalline high polymer is rapidly cooled, the resulting crystal size is small and transparent and does not show any light scattering property. As mentioned above, the heat hysteresis between melting and crystalline solidification is an important process for determining the crystallinity of a crystalline high polymer, and it is possible to obtain an optional crystallinity, i.e. rear projection screen characteristics, by a heat treatment capable of controlling said process. This heat treating condition contains the treating temperature and the time change. Therefore, a very complicated and accurate heating control is necessary for producing rear projection screens having desired properties with a uniform quality in a mass production, and further such complicated and accurate heating control is disadvantageous from an economical point of view. More particularly, it is very difficult to impart desirable screen characteristics uniformly to the whole surface of the screen upon producing a large rear projection screen for video projectors.

Furthermore, a rear projection screen can be used in various application fields, but the required screen characteristics depend on the purposes and circumstances of use. For example, when it is used for a looking and listening education machine for a group, an excellent light scattering property is required for the purpose of giving a wide field angle and a bright image. On the contrary, when the rear projection screen is used for a studying machine for an individual or a microreader, light is required rather than light scattering property. Therefore, the crystal growing heat treatment conditions vary depending upon each individual required characteristics, and complicated heat treatment conditions should be set and design of the heat treating devices should be changed.

The light scattering caused by crystalline high polymers is reviewed in detail below. The behavior largely depends on the distribution state of the difference of optical characteristics, particularly, refractive index, between the amorphous substance constituting the crystalline high polymer and the crystal portions grown dispersingly therein. In addition, polymers contain not only clear two phases, that is, amorphous state ⇌ crystal state, but also many intermediate states depending upon the coagulating state of the molecular chains existing nonuniformly in a fine state (from a microscopic point of view). Consequently, when the above mentioned intermediate states are present as intermediate phases, there are differences of refractive indexes such as [amorphous phase-intermediate phase], and [intermediate phase-crystalline phase] smaller than the difference [amorphous phase-crystalline phase]. Therefore, there exist very close differences. In other words, the relation may be shown as follows: [refractive index of amorphous phase < refractive index of intermediate phase $M_1$ < . . . < refractive index of intermediate phase Mn < refractive index of crystalline phase].

According to prior art methods, the ratio of the content of the intermediate phase high polymer, having an intermediate refractive index between the refractive index of the amorphous phase and that of the crystalline phase, is controlled by a crystal growing heat treatment to give a rear projection screen having desirable optical characteristics. However, the prior art method is generally carried out in a crystallization process from the melted state of the crystalline high polymer material by adjusting the crystal growing temperature and time to control the ratio of intermediate phases formed in the amorphous phase (heat treatment method). Therefore, it is extremely difficult to obtain a large rear projection screen having predetermined desirable optical characteristics, uniform quality, and suitable for mass production.

Conventional rear projection screens utilizing crystalline high polymers have been subjected to the above mentioned heat treatment to adjust the screen characteristics. Consequently, high techniques and precision apparatus are required for obtaining a rear projection screen having satisfactory lightness, light transmission scattering property, resolution power, and glare. Therefore, the conventional rear projection screens are not suitable for mass production and the cost is so expensive that it is commercially of low value.

There is another method for controlling optical characteristics of crystalline high polymer materials by incorporating an additive. For example, Japanese Patent Publication No. 19257/1973 discloses incorporating a finely divided (5-50 microns) crystal deforming agent such as starch, sucrose octoacetate, cellulose acetate butyrate and the like into the crystalline high polymer. The crystal deforming agent is an agent capable of existing without being melted when a crystalline high polymer material is melted and crystallized and deforms a part of the growing direction of the crystal particles so as to increase the light scattering property. The crystal deforming agent can disturb the degree of freedom of crystal growth to deform the shape of the crystals resulting in an improvement in light scattering property.

However, according to the above mentioned method utilizing a crystal deforming agent, the crystal deforming agent does not melt so that light is reflected at the contact interface between the crystalline high polymer and the crystal deforming agent unless their compatibility is excellent and thereby, back scattering is caused which often fails to satisfy the lightness required by the rear projection screen.

SUMMARY OF THE INVENTION

According to the present invention, there is provided a rear projection screen comprising a light scattering member composed of a melted mixture containing at least two high polymers having different refractive indexes.

It is an object of the present invention to provide a rear projection screen having light projection scene, excellent light transmission scattering, and wide field angle.

It is another object of the present invention to provide a rear projection screen having high resolution and being free from glare.

It is a further object of the present invention to provide a rear projection screen having very little back scattering, excellent contrast and excellent shapeability.

It is still another object of the present invention to provide a method for producing the rear projection screen.

BRIEF DESCRIPTION OF THE DRAWING

FIG. 1 schematically shows a cross sectional view of an apparatus for conducting a liquid bath method for conducting a crystal growing heat treatment according to the present invention.

FIG. 2 illustrates a rear projection screen and its use.

DESCRIPTION OF THE PREFERRED EMBODIMENTS

According to the present invention, the above objects may be attained by incorporating into a dispersion medium polymer, a polymer having an intermediate phase state of said dispersion medium polymer or a polymer having an optical property different from that of the dispersion medium polymer as a dispersed phase polymer by directly melting and mixing.

The dispersed phase polymer may be one polymer or a multi-component melted mixture of a plurality of polymer species depending upon the desired characteristic of the rear projection screen.

In general, the content of the dispersed phase polymer is from 1 to 50% by weight, preferably from 5 to 40% by weight, more preferably from 5 to 30% by weight based on the total amount of the dispersion medium polymer and the dispersed phase polymer.

With respect to the refractive indexes of the dispersed phase polymer and the dispersion medium polymer, taking into consideration an optical reflection at the interface between the polymers constituting a rear projection screen, it is preferable that their refractive indexes are similar as much as possible, but when they are two near, the light scattering property is so decreased that, in general, the difference of the refractive indexes ($\Delta n$) between the dispersion medium and the dispersed phase preferably ranges from 0.01 to 0.25. Polymer materials, even if they are homopolymers, are inherently of polymolecularity because various intermediate phase states are formed during the production. Thus, high polymer materials are a collection of molecules having various sizes, and have a distribution of molecular weight, in other words, a distribution of refractive index. Therefore, the above mentioned refractive index is an averaged refractive index of mixtures containing various intermediate phase states.

When the rear projection screen according to the present invention is composed of a light scattering member comprising a multi-melted mixture of high polymers, the difference of the refractive indexes is the difference between the refractive index of the dispersion medium polymer and the maximum refractive index among the refractive indexes of the dispersed phase polymers.

As the dispersion medium polymer and the dispersed phase polymer according to the present invention, there may be used amorphous polymers and crystalline polymers. For example, when the following systems are employed, there are obtained preferable rear projection screen:

(a) amorphous polymer (as dispersion medium polymer) and crystalline polymer (as dispersed phase polymer)

(b) crystalline polymer (as dispersion medium polymer) and amorphous polymer (as dispersed phase polymer)

(c) crystalline polymers as dispersion medium polymer and dispersed phase polymer.

It is preferable that at least one crystalline polymer is present in the system composed of the dispersion medium polymer and dispersed phase polymer.

As an important optical characteristic of the rear projection screen, there may be mentioned a total scattering transmission (Td). Td is determined by measuring with an integrated sphere the scattering transmission light when a light having a wave length of 550 millimicrons is perpendicularly projected to a sheet-like sample. Td is useful for evaluating the lightness of a rear projection screen.

Another factor for evaluation of a field angle of a rear projection screen is an angle ($\theta_{\frac{1}{2}}$) which is defined as an angle formed between the optical axis of the perpendicular transmission light and a transmission light having an intensity of half of that of the perpendicular transmission light ($I_{\theta=0°}$).

In the rear projection screen of the present invention, generally Td is not lower than 70% and $\theta_{\frac{1}{2}}$ is not lower than 15°, and it is preferable that Td is not lower than 75% and $\theta_{\frac{1}{2}}$ is not lower than 20°.

According to the present invention, upon melting and mixing the polymers, the polymers may be selected based on the following matters: (i) the softening points of the polymers are as close to each other as much as possible: (ii) the molecular structures of the polymers are similar; and (iii) the polymers are excellently miscible.

For example, in the case of polyethylene, a crystalline high polymer, it is known that there are low density polyethylene and high density polyethylene depending upon the production method. When a high pressure polymerization method is employed, there is obtained polyethylene having a high degree of branching and a low degree of crystallinity. On the contrary, when a low pressure polymerization method is employed, there is obtained polyethylene having an extremely low degree of branching and a high degree of crystallinity. These are called low density polyethylene and high density polyethylene, respectively. The light scattering property of high density polyethylene is excellent because the degree of crystallinity is as high as 70–90% though said degree of crystallinity varies depending upon the heat treatment condition. On the contrary, the light scattering property of low density polyethylene is very poor because the degree of crystallinity is about 50% at most even at the best conditions and in addition, its crystal portion contains a considerable amount of amorphous portion different from high density polyethylene, in other words, the crystal contains a large amount of impurities.

However, this crystalline state of low density polyethylene containing a large amount of impurities is the same as the intermediate phase between the amorphous and crystal line phases of high density polyethylene (at the coagulation state). When a high density polyethylene is blended therewith, there is obtained an ideal coagulation state composed of amorphous phase—intermediate phase (=low density polyethylene crystal)— crystal phase (=high density polyethylene crystal), i.e. an ideal difference of indexes, suitable for a rear projection screen.

According to the process of the present invention, two or more polymers are melted and mixed and thereby there is newly obtained a polymer showing an intermediate phase state of each original polymers. Therefore, the contact interface between the different polymers can be a difference between the sufficiently close refractive indexes and optical reflection at the contact interface between the polymers is decreased. As a result, it is possible to produce a very light rear projection screen of low back scattering.

According to the present invention, even when a light scattering material obtained by melting and mixing is directly made into a rear projection screen, there can be obtained a rear projection screen having sufficient rear projection screen characteristics. When the above mentioned light scattering member is made into a film, sheet or plate form followed by applying a crystal growing heat treatment, there can be obtained a rear projection screen having more excellent rear projection screen characteristics. This improving effect is particularly remarkable when a crystalline high polymer is present in the polymer used.

As preferable polymers used in the present invention, there may be mentioned polyolefin resins such as polyethylene, polypropylene and the like, polyester resins such as polyethylene terephthalate, polyamide resins such as 6-nylon, 6,6-nylon, 6,10-nylon and the like, acrylic resins such as polymethyl methacrylate, polymethyl acrylate and the like, polyvinyl chloride resins, polyvinyl acetate resins, polyacetal resins, polystyrene, polycarbonate, synthetic rubber resins such as nitrile rubber, neoprene rubber, chloroprene rubber, styrene-butadiene rubber and the like, and copolymers of the monomers constituting the above mentioned polymers such as ethylene-vinyl acetate copolymers, styrene-acrylonitrile copolymers and the like.

According to the present invention, two or more of the above mentioned polymers may be used in a blend form.

The present inventors have investigated the effect of the present invention as to (i) mutual solubility, (ii) mutual action (particularly, negative factor affecting crystallinity), (iii) shapeability and (iv) light scattering property by using various blended high polymer materials with various blend ratio. As the result, the present inventors have found that when chemical structures of the high polymer materials to be blended are similar to each other and the mutual solubility is excellent, for example, the blend ratio is 5–40%* with respect to polypropylene (olefin resin) and ethylene-vinyl acetate copolymer to high density polyethylene (*within a range not deteriorating the crystallinity of high density polyethylene), there can be obtained an excellent light scattering property.

It is not always necessary that the high polymer material to be blended shows an intermediate phase of the dispersion medium, but it is important that a plurality of components having different optical characteristics are nonuniformly dispersed at the final state of melting and mixing. Therefore, two or more may be blended, and a dispersion medium polymer may be combined with other crystalline high polymers or copolymers.

In addition, the dispersed phase polymer may be a polymer different from the type of the dispersion medium polymer and may be a dispersion medium polymer in an intermediate phase state.

The following examples are given for illustrating the present invention, but should not be construed as limiting the present invention.

EXAMPLE 1

As the dispersion medium polymer, there was used a crystalline high polymer, high density polyethylene ($\rho=0.970$, M.I.=6.0) and as the high polymer material to be blended, there was used low density polyethylene, ethylene-vinyl acetate copolymer resin (E verflex), or polypropylene to investigate the blending effect. The blending conditions were as shown in Table 1 below. The evaluation was made by forming a sheet of 0.35±0.05 m/m in thickness and 50 cm in width and measuring Td and $\theta_{\frac{1}{2}}$. The result is shown in Table 1.

For comparison, there is described a result with respect to a sample produced by applying heat treatment (liquid bath method, at 123° C. for 25 minutes) to a high density polyethylene to improve the light scattering property. (cf. Comparison sample (I), Sample No. 9).

The heat treatment (liquid bath method) was applied by using an apparatus as shown in the drawing attached and the heat transfer medium was SK-Oil #260.

In the drawing, the reference numbers 1, 2, 3, 4, 5 and 6 respectively denote a sheet to be treated, movable rollers (upper and lower), fixed roller, a lever for adjusting the movable roller, a liquid bath and a bath liquid (heat transfer medium).

temperature is maintained not lower than the softening temperature of the light scattering member sheet and not higher than the melting point thereof.

When the above mentioned crystallization heat treatment is additionally applied to the rear projection screen of the present invention, the screen characteristics are further improved. (cf. Comparative sample, Sample No. 10).

Table 1

| Sample No. | Blending Conditions ||| Screen Characteristics ||
| | Dispersion medium polymer | Dispersed phase polymer | Weight % of dispersed phase polymer | Td(%) | $\theta_{\frac{1}{2}}$(degree) |
|---|---|---|---|---|---|
| 1 | High density polyethylene (HDPE) | — | — | 69.0 | 20 |
| 2 | High density polyethylene (HDPE) | Low density polyethylene (LDPE) | 15 | 78 | 24 |
| 3 | High density polyethylene (HDPE) | Low density polyethylene (LDPE) | 25 | 79 | 23 |
| 4 | High density polyethylene (HDPE) | Ethylene-vinyl acetate copolymer (EVA) | 15 | 76 | 28 |
| 5 | High density polyethylene (HDPE) | Ethylene-vinyl acetate copolymer (EVA) | 25 | 73 | 33 |
| 6 | High density polyethylene (HDPE) | Polypropylene (P.P.) | 15 | 75 | 32 |
| 7 | High density polyethylene (HDPE) | Polypropylene (P.P.) | 25 | 75 | 37 |
| 8 | High density polyethylene (HDPE) | LDPE EVA (three component system) | 10 10 | 85 | 16 |
| 9 | Sample No. 1 subjected to crystallization heat treatment (123° C., 25 minutes) | | | 71.5 | 34.8 |
| 10 | Sample No. 7 subjected to crystallization heat treatment | | | 70.0 | 46.0 |

The crystal growing heat treatment as shown in the drawing uses a liquid as a heat transfer medium and the structure of apparatus is simple and furthermore, the sheet itself is present in the liquid at the heat treatment step so that the efficiency is high and heat can be uniformly applied to the whole surface of the sheet and the transferring and supporting are simple. Therefore, this method is far better than the above mentioned conventional heat treatment method.

The heat treatment method is carried out by passing a material to be treated through a liquid bath (heat transfer medium) maintained at a required heat treatment temperature and the heat treatment condition is controlled by adjusting the temperature of the liquid bath and the passing time through the liquid bath. The As is clear from the above results, according to the present invention, desired screen characteristics can be simply obtained by selecting the polymers and controlling the blending ratio appropriately without complicated heat control as in conventional heat treatment methods.

EXAMPLE 2

Following the procedure of Example 1 except that the following dispersion medium polymer, dispersed phase polymer and blending ratio were employed in place of those in Example 1, the results are shown in Table 2 below (Thickness of the sheet was 0.50±0.05 m/m).

Table 2

| Sample No. | Blending Conditions ||| Screen Characteristics ||
| | Dispersion medium polymer | Dispersed phase polymer | Weight % of dispersed phase polymer | Td(%) | $\theta_{\frac{1}{2}}$ (degree) |
|---|---|---|---|---|---|
| 11 | Polypropylene (P.P.) | Polyvinyl chloride (P.V.C.) | 10 | 83 | 20 |
| 12 | " | 6-Nylon | 20 | 80 | 24 |
| 13 | 6,6-Nylon | Polystyrene (P.St.) | 15 | 81 | 23 |
| 14 | " | 6-Nylon | 30 | 77 | 30 |
| 15 | Polyethylene terephthalate (P.E.T.) | Polyethylene (P.E.) | 20 | 77 | 26 |
| 16 | Polyethylene terephthalate (P.E.T.) | P.St. | 20 | 74 | 30 |
| 17 | Polyethylene terephthalate (P.E.T.) | 6-Nylon | 20 | 75 | 32 |
| 18 | P.St. | P.V.C. | 15 | 83 | 18 |
| 19 | " | Polymethyl methacrylate (P.M.M.A.) | 15 | 85 | 16 |
| 20 | " | Styrene-acrylonitrile | 7 | 91 | 15 |

Table 2-continued

| | Blending Conditions | | | Screen Characteristics | |
|---|---|---|---|---|---|
| Sample No. | Dispersion medium polymer | Dispersed phase polymer | Weight % of dispersed phase polymer | Td(%) | $\theta_{\frac{1}{2}}$ (degree) |
| 21 | High density polyethylene (H.D.P.E.) | copolymer (A.S.) P.M.M.A. Low density polyethylene (L.D.P.E.) Ethylene-vinyl acetate copolymer (E.V.A.) | 7 10 10 | 80 | 25 |
| 22 | High density polyethylene (H.D.P.E.) | L.D.P.E. E.V.A. | 20 10 | 82 | 23 |
| 23 | High density polyethylene (H.D.P.E.) | L.D.P.E. P.P. | 35 20 | 85 | 25 |
| 24 | High density polyethylene (H.D.P.E.) | P.P. E.V.A. | 30 10 | 83 | 24 |
| 25 | L.D.P.E. | H.D.P.E. P.P. E.V.A. | 20 15 15 | 85 | 22 |
| 26 | P.St. | Neoprene Rubber | 15 | 80 | 17 |

We claim:

1. A rear projection screen which comprises a light scattering member composed of a melted mixture of at least two high polymers obtained by melting and then mixing said high polymers, wherein the absolute value of the difference between the refractive indexes of the high polymers is from 0.01 to 0.25.

2. A rear projection screen according to claim 1 in which at least one of the high polymers is a crystalline high polymer.

3. A rear projection screen according to claim 1 in which at least one of the high polymers is an amorphous high polymer.

4. A rear projection screen according to claim 1 in which all of the high polymers are crystalline high polymers.

5. A rear projection screen according to claim 1 in which the high polymers are selected from the group consisting of polyolefin resins, polyester resins, polyamide resins, acrylic resins, polyvinyl chloride resins, polyvinyl acetate resins, polyacetal resins, polystyrene, polycarbonates, synthetic rubber resins and copolymers of the monomers constituting said high polymers.

6. A rear projection screen according to claim 1 in which the total scattering transmission (Td) of the light scattering member is not lower than 70% and the angle, $\theta_{\frac{1}{2}}$, formed between the optical axis of the light transmitted perpendicularly from said light scattering member ($I_{\theta=0°}$) and the optical axis of the transmitted light having an intensity of half of that of the perpendicularly transmitted light is not less than 15°.

7. A rear projection screen according to claim 1 in which the total scattering transmission (Td) of the light scattering member is not lower than 75% and the angle, $\theta_{\frac{1}{2}}$, formed between the optical axis of the light transmitted perpendicularly from said light scattering member ($I_{\theta=0°}$) and the optical axis of the transmitted light having an intensity of half of that of the perpendicularly transmitted light is not less than 20°.

8. A rear projection screen according to claim 8 in which the polyolefin resin is selected from the group consisting of polyethylene and polypropylene.

9. A rear projection screen according to claim 5 in which the polyester resin is polyethylene terephthalate.

10. A rear projection screen according to claim 5 in which the polyamide resin is selected from the group consisting of 6-nylon, 6,6-nylon and 6, 10-nylon.

11. A rear projection screen according to claim 5 in which the acrylic resin is selected from the group consisting of poly (methyl acrylate) and poly (methyl methacrylate).

12. A rear projection screen according to claim 5 in which the synthetic rubber resin is selected from the group consisting of nitrile rubber, neoprene rubber, chloroprene rubber and styrene-butadiene rubber.

13. A rear projection screen according to claim 5 in which the copolymer is selected from the group consisting of ethylene-vinyl acetate copolymers and styrene-acrylonitrile copolymers.

14. A rear projection screen which comprises a light scattering member composed of a melted mixture consisting essentially of a dispersion medium polymer and a dispersed phase polymer dispersed therein, said melted mixture being obtained by melting and then mixing said polymers, wherein the absolute value of the difference between the refractive index of the dispersion medium polymer and the maximum refractive index of the dispersed phase polymer is from 0.01 to 0.25, and wherein the dispersion medium polymer is a member selected from and the dispersed phase polymer is at least one member selected from the group consisting of high density polyethylene, low density polyethylene, polypropylene, polyethylene terephthalate, 6-nylon, 6,6-nylon, 6,10-nylon, polymethyl methacrylate, polymethyl acrylate, polyvinyl chloride resins, polyvinyl acetate resins, polyacetal resins, polystyrene, polycarbonates, nitrile rubber, neoprene rubber, chloroprene rubber, styrene-butadiene rubber, ethylene-vinyl acetate copolymers, and styrene acrylonitrile copolymers.

15. A rear projection screen according to claim 14 in which the content of the dispersed phase polymer in the melted mixture is 1–50% by weight based on the total weight of the melted mixture.

16. A rear projection screen according to claim 15 in which the content of the dispersed phase polymer is 5–40% by weight.

17. A rear projection screen according to claim 15 in which the content of the dispersed phase polymer is 5-30%.

18. A rear projection screen according to claim 14 in which the total scattering transmission (Td) of the light scattering member is not lower than 70% and the angle, $\theta_{\frac{1}{2}}$, formed between the optical axis of the light transmitted perpendicularly from said light scattering member ($I_{\theta=0°}$) and the optical axis of the transmitted light having an intensity of half of that of the perpendicularly transmitted light is not less than 15°.

19. A rear projection screen according to claim 14 in which the total scattering transmission (Td) of the light scattering member is not lower than 75% and the angle $\theta_{\frac{1}{2}}$, formed between the optical axis of the light transmitted perpendicularly from said light scattering member ($I_{\theta=0°}$) and the optical axis of the transmitted light having an intensity of half of that of the perpendicularly transmitted light is not less than 20°.

20. A rear projection screen according to claim 14 in which the dispersion medium polymer is selected from the group consisting of high density polyethylene, low density polyethylene, polypropylene, 6,6-nylon, polyethylene terephthalate and polystyrene.

21. A rear projection screen according to claim 14 in which the dispersed phase polymer is selected from the group consisting of high density polyethylene, low density polyethylene, polypropylene, 6-nylon, polyvinyl chloride, polystyrene, polymethyl methacrylate, neoprene rubber, ethylene-vinyl acetate copolymers and styrene-acrylonitrile copolymers.

22. A rear projection screen according to claim 14 in which the dispersion medium polymer is high density polyethylene and the dispersed phase polymer is polypropylene 23. A rear projection screen according to claim 14 in which the dispersion medium polymer is high density polyethylene and the dispersed phase polymer is composed of low density polyethylene and an ethylene-vinyl acetate copolymer.

24. A process for producing a rear projection screen which comprises melting and mixing at least two high polymers having different refractive indexes, wherein the absolute value of the difference between the refractive indexes of the high polymers is from 0.01 to 0.25, to produce a light scattering member and applying a crystal growing heat treatment to said member at a temperature not higher than the melting point of said member and not lower than the softening point of said member.

25. A process according to claim 24 in which the crystal growing heat treatment is effected in a liquid heat transfer medium.

26. A rear projection screen which comprises a light scattering member composed of a melted mixture of a dispersed phase polymer dispersed in a dispersion medium polymer, said melted mixture being obtained by melting and then mixing said polymers, wherein the absolute value of the difference between the refractive index of the dispersion medium polymer and the maximum refractive index of the dispersed phase polymer is from 0.01 to 0.25, wherein the dispersion medium polymer and dispersed phase polymer are miscible with each other and have softening points which are as close as possible, and wherein the dispersion medium polymer is a polymer selected from and the dispersed phase polymer is at least one polymer selected from the group consisting of polyolefin resins, polyester resins, polyamide resins, acrylic resins, polyvinyl chloride resins, polyvinyl acetate resins, polyacetal resins, polystyrene, polycarbonates, synthetic rubber resins and copolymers of the monomers constituting said polymers.

27. A rear projection screen according to claim 26 wherein at least one of said dispersed phase polymer and said dispersion medium polymer is a crystalline polymer.

28. A rear projection screen according to claim 26 wherein said dispersion medium polymer is a polymer selected from and the dispersed phase polymer is at least one polymer selected from the group consisting of polyethylene, polypropylene, polyethylene terephthalate, 6-nylon, 6,6-nylon, 6,10-nylon, polymethyl methacrylate, polymethyl acrylate, polyvinyl chloride resins, polyvinyl acetate resins, polyacetal resins, polystyrene, polycarbonates, nitrile rubber, neoprene rubber, chloroprene rubber, styrene-butadiene rubber, ethylene-vinyl acetate copolymers, and styrene acrylonitrile copolymers.

* * * * *

UNITED STATES PATENT AND TRADEMARK OFFICE
CERTIFICATE OF CORRECTION

PATENT NO. : 4,174,883
DATED : November 20, 1979
INVENTOR(S) : KIROYUKI IMATAKI, ET AL It is certified that error appears in the above-identified patent and that said Letters Patent are hereby corrected as shown below:

Column 5, line 12, after "possible" change the colon to a semi-colon.

Column 6, line 63, change "θ 1/2" to -- $\theta_{1/2}$ --.

Claim 8, change the dependency of claim 8 from "claim 8" to --claim 5--.

Signed and Sealed this

Twenty-fifth Day of March 1980

[SEAL]

Attest:

SIDNEY A. DIAMOND

Attesting Officer

Commissioner of Patents and Trademarks